(No Model.)

J. B. THURSTON.
INTERLOCKING JOINT FERRULE.

No. 505,579. Patented Sept. 26, 1893.

Witnesses
W. B. Howe
F. A. Merrill

Inventor
J. B. Thurston

UNITED STATES PATENT OFFICE.

JAMES B. THURSTON, OF CONCORD, NEW HAMPSHIRE.

INTERLOCKING-JOINT FERRULE.

SPECIFICATION forming part of Letters Patent No. 505,579, dated September 26, 1893.

Application filed December 1, 1892. Serial No. 453,754. (No model.)

*To all whom it may concern:*

Be it known that I, JAMES B. THURSTON, a citizen of the United States, residing at Concord, in the county of Merrimac and State of New Hampshire, have invented a certain new and useful Improved Interlocking-Joint Ferrule; and I do hereby declare the following to be a full, clear, and exact description of the invention, such as will enable others skilled in the art to which it appertains to make and use the same.

The invention relates to the metallic joints used to unite sections of a fishing-rod.

The ordinary metal joints heretofore most commonly used consist of plain plug and socket ferrules. Sometimes these joints give little trouble and seem to operate effectively, while at others they will stick so badly as to be practically inoperative either when being connected or pulled apart, as many of those who fish can testify. If the ferrules go together easily, some sections of the rod are likely to part, either at the critical moment while landing a fish, or, while trailing the rod through bushes which occasionally cannot be avoided;—and if the ferrules go together hard, the rod is sometimes broken in the attempt to separate the sections, owing to the rust or atmospheric effect upon the ferrules.

In my improved ferrules I avoid all the foregoing defects, the joints being under any such conditions easily connected and disconnected, and perfectly firm and secure when joined.

My invention comprises a slotted socket ferrule and sliding sleeve, and consists essentially in the interlocking depressions of the plug and socket ferrules, as fully set forth in the following specification and claims and clearly illustrated in the accompanying drawings forming a part of same, of which—

Figure 1:
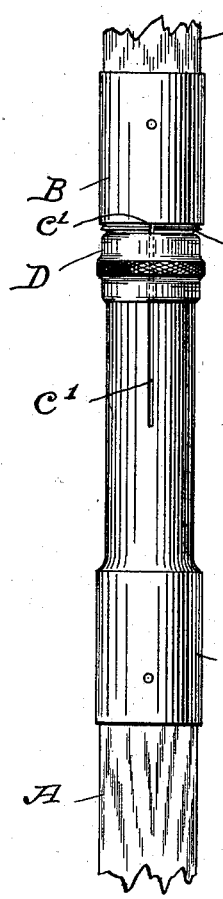
Figure 3:
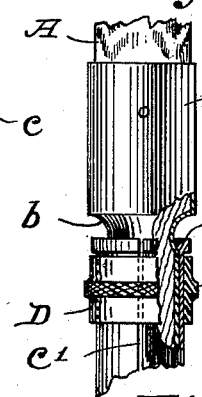
Figure 2:
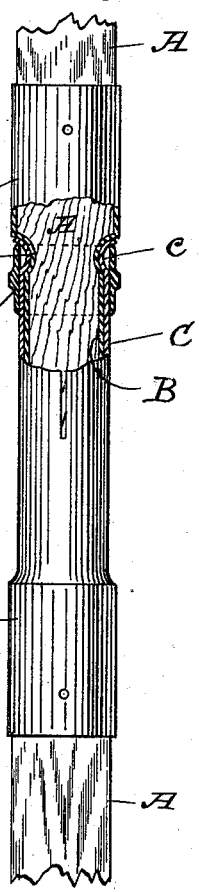
Figure 4:
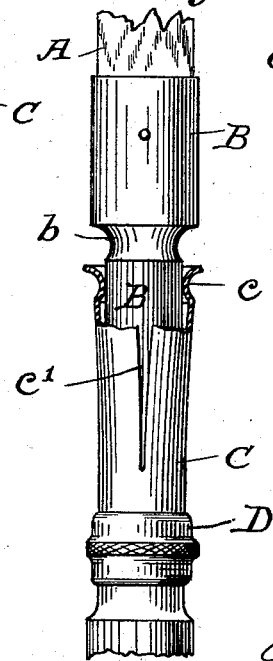

Figure 1. is a broken elevation showing the adjacent end of two sections of rod connected by my improved joint. Fig. 2. is a broken elevation, showing my improved parts in section. Fig. 3. is a similar view of the same parts showing my improvements in slightly modified form. Fig. 4. is a broken elevation showing that construction illustrated in Figs. 1 and 2, as when partially connected.

Similar reference letters denote corresponding parts.

A are the rod sections, B, the plug ferrule, and C, the socket ferrule of my improved metallic joints for fishing rods.

The socket ferrule is made a snug fit for the plug ferrule as is the case in any common joint of this kind, and then the interior diameter is reduced at its mouth in any convenient manner, such for instance as is shown in Figs. 2, 3, and 4, *i. e.*—an annular depression $c$, is formed at or near the mouth of said socket ferrule, by compressing the metal on its outside. The plug ferrule B, is then grooved or depressed as at $b$, at or near its shoulder $b'$, where the depression $c$, of the socket ferrule C may engage with it when pushed way on. The said socket ferrule C, is then slotted in one side as at $c'$, in order that it may receive the plug ferrule B, and is provided with a snug fitting sleeve D, as shown in the drawings.

To connect or joint up a rod having my improved ferrules, the sleeve D is first pushed down so that the socket C, may spread to receive the plug B, (all of which is shown in Fig. 4) and when the depression $b$, receives the depression $c$, as seen in Fig. 2, the sleeve D, is pushed up and closing over them effectively prevent their disengagement.

Both ferrules may retain their respective diameters throughout their entire length, and the sleeve D may also be straight bore, which simplifies the construction of this improved joint, and this is made possible for the reason that the connection or locking of the two ferrules, is dependent wholly upon engagement of the depressions $b$—$c$, and the sleeve D, which maintains such engagement.

When properly constructed the sleeve D, is quite as easily moved when performing its function as seen in Fig. 1, as when in the position shown in Fig. 4, and thus any of the difficulties attending the manipulation of the ordinary joints are obviated, and the joint is sure to be secure when locked.

The construction shown in Fig. 3. shows a little more decided stop upon the outside ferrule C, against which the sleeve D, will rest when in a position to lock the joint, and less depressed metal for engaging with the depression $b$ in the ferrule B, but its operation is practically the same as the other construction.

Having described my improvements, what I claim is—

1. In plug and socket ferrule-joints, a plug ferrule having an annular groove or depression, a slotted socket-ferrule having an annular depression at or near its mouth, and a sliding sleeve adapted to close over said depressed portions of the ferrules and hold them in engagement.

2. In plug and socket ferrules, a plug-ferrule having an annular depression near its seat and its remainder being practically of equal diameter, a slotted socket ferrule having its interior diameter slightly decreased at or near its mouth and its remainder, also its outside diameter, being equal throughout its length, and a sliding sleeve capable of closing over that portion of said socket ferrule which engages with the depressed portion of said plug ferrule.

3. The plug and socket ferrules having interlocking ridges or depressions, the socket or outside ferrule being slotted, both said ferrules being of even diameter throughout their length, and a snug fitting sleeve for the socket ferrule being of even bore substantially for the purpose set forth.

In testimony whereof I affix my signature in presence of two witnesses.

JAMES B. THURSTON.

Witnesses:
 FRANK A. MERRIN,
 CARRIE E. EVANS.